Sept. 6, 1949.  P. A. PIERREZ  2,481,444
PORTABLE TROUBLE LIGHT FOR AUTOMOBILES
Filed Sept. 18, 1947

INVENTOR.
P. A. PIERREZ
BY
ATTORNEY

Patented Sept. 6, 1949

2,481,444

UNITED STATES PATENT OFFICE 2,481,444

PORTABLE TROUBLE LIGHT FOR AUTOMOBILES

Percival A. Pierrez, Belleville, N. J., assignor to La Scola Corporation, Orange, N. J., a corporation of New Jersey Application September 18, 1947, Serial No. 774,815

8 Claims. (Cl. 177—329)

1

The device of the instant invention is a portable lamp especially adapted for electrical connection to the electric circuit of an automotive vehicle. It embodies novel features of construction which permit of the ready assembly thereof, facilitating the initial manufacture thereof, and the disassembly of the device for replacement or repair of the parts.

The foregoing and other advantageous features and objects, will appear from the drawings and description hereinafter.

Figure 1:
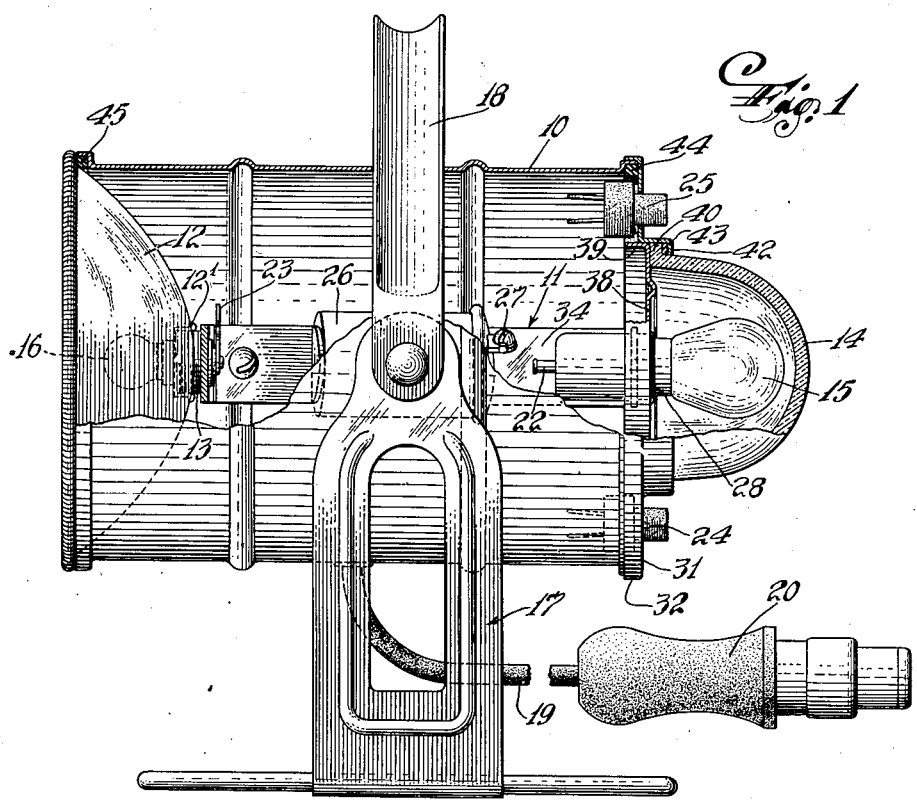
Figure 2:
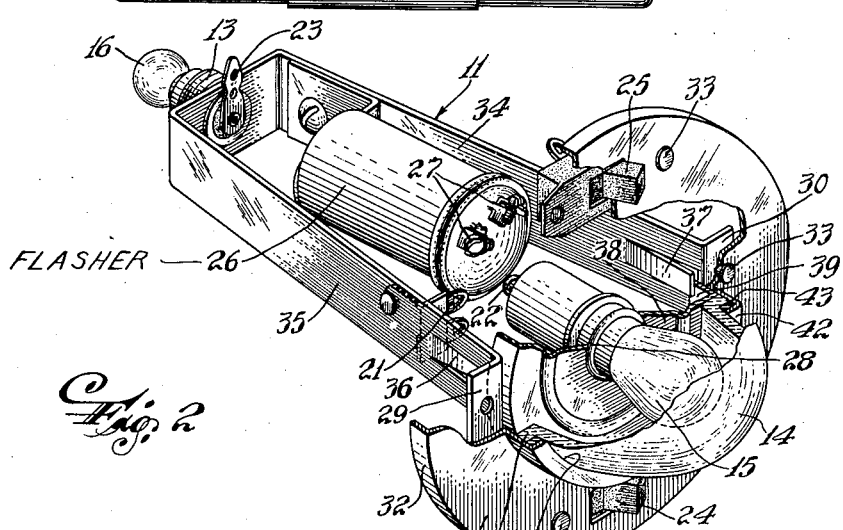

In the drawings, which illustrate one of the many possible forms of my invention, Fig. 1 is a side elevational view, partly fragmentary, of a portable lamp embodying the invention, and Fig. 2 is a perspective, partly fragmentary, view of the frame unit adapted to be removably secured to the casing of the lamp.

The portable lamp device of my invention, as shown in the drawings, comprises a tubular casing 10 adapted to removably receive the frame unit 11. The latter is provided with a socket ferrule 13 or the like adapted to have complementary engagement with the ring 12' medially secured to and carried by the rim 12. Preferably, the rim 12 constitutes a reflector for the trouble light 16 and the ring 12' is internally threaded for engagement with the complementarily threaded ferrule 13 of the frame unit 11. The bulb 15 which is secured to the frame unit 11 in manner hereinafter more particularly described, may be a warning light. The device is provided with a standard or support 17, and a handle 18 of any desired convenient construction and is connected to the electric circuit of the vehicle by means of a cable 19, which is provided at one end with a plug 20 to engage a suitable complementary outlet in the vehicle, the opposite end of the cable being electrically connected with the contact plate 21 with which the contacts 22 and 23 of the bulbs 15 and 16 are connected by suitable wires into which are cut the switches 24 and 25 by means of which the bulbs 15 and 16 may be turned on and off as desired by the user.

If it is desired that the bulb 15 be operated intermittently on and off to further emphasize the warning signal given thereby, flasher unit 26, which alternately makes and breaks an electric circuit, and which may be of any desired or convenient type suited for that purpose and well known in the art, is secured to frame unit 11, said unit 26 being provided with contacts 27 which are cut into the wires between the contacts 21 and one of the switches 24, 25 which controls the

2 bulb 15. The wiring between the various contacts described and the switch elements may be of any desired or convenient type, such as will be obvious to those skilled in this art.

Pursuant to the instant invention, the frame 11 is provided with spaced parallel arms 34 and 35 having angularly directed flanged ends 29 and 30 to which a disc 31 is secured, by means of rivets 33 or the like, said disc having a circumferential downturned flange 32. The arms 34 and 35 are provided with latch tongues 36 and 37 struck up therefrom or with other latching means. The bulb 15 is secured to the socket 28 carried by the plate 38, the latter being provided with a circumferential downturned flange 39. The bulb 15 is provided with a lens 14, which may be a colored lens, and which lens has a rim 40 positioned upon the plate 38, the lens passing through the aperture 41 which is defined by the circular inwardly directed step portion 42 of the disc 31. Thus, the rim 40 of the lens is disposed between the plate 38 and the step portion 42 of the disc 31. A washer 44 may be interposed between the disc 31 and one end of the casing 10, and a similar washer 45 may be positioned between the other end of the casing and the rim 12, and a washer 43 may be interposed between the lens 14 and disc 31. The lens 14 is inserted into the aperture of the disc 31, and the plate 38 is positioned against the rim 40 of the lens by passing said plate 38 between the tongues 36 and 37 upwardly within the frame unit 11; plate 38, engaging the tongues 36 and 37 of the frame unit 11, urges the tongues outwardly until the plate 38 has passed the free ends of said tongues, at which time the tongues snap back to their original position, interlocking the parts as shown in Fig. 2. Reversing the process, the plate 38 and the lens 14 may be removed.

The assembled bracket unit of the frame unit 11 is positioned in the casing 10, closing one free end thereof, and the rim 12 is rotated at the other end of the casing so that the threaded ring 12' thereof threadedly engages the threaded ferrule 13 of the frame unit 11, drawing the parts together to complete the assembly thereof, as shown in Fig. 1. By reversing the procedure mentioned, the parts may be readily disassembled for repair or replacement.

The structure described provides for tightly locking the parts in the casing 10, and sealing the casing in the assembly operation; at the same time, the parts may be readily disassembled, when desired.

Having thus described my invention, what I claim as new and desire to secure by Letters Patent is:

1. A portable lamp device comprising a tubular casing, having two open ends, a U-shaped frame, a ferrule secured to one end of said frame, a disc secured to the other end of said frame, light bulb holding means on said disc, said disc and one end of said casing being adapted to have registering engagement to close said end, a rim adapted to have registering engagement with the other end of said casing to close the same, and complementary means on said rim and ferrule to secure the same together, to assemble the device.

2. In a portable lamp device comprising a tubular casing having at least one open end, a frame adapted to be secured to said casing, through said open end, tongues struck up from said frame, a disc secured to said frame, said disc having a circular inwardly directed step portion defining a medial aperture, a plate provided with a circumferential, downturned flange, a light bulb unit secured to said plate, said downturned flange adapted to engage the tongues of said frame when the plate is inserted in said frame for registry with the step portion, to snap past the free ends of said tongues, to interlock therewith.

3. In a portable lamp device comprising a tubular casing, having an open end, a U-shaped frame, a ferrule secured to one end of said frame, a bulb-supporting disc secured to the other end of said frame, said disc and open end of said casing being adapted to have registering engagement to close said end, a rim adapted to have registering engagement with the other end of said casing to close the same, and complementary threaded means on said rim and ferrule to secure the same together, to assemble the device.

4. In a portable lamp device comprising a tubular casing having at least one open end, a frame adapted to be secured to said casing through said end, tongues struck up from said frame, a disc secured to said frame, said disc having a medial aperture, a plate, a light bulb unit secured to said plate, said plate adapted to engage the tongues of said frame when the plate is inserted in said frame, to snap back past the free ends of said tongues, to interlock therewith.

5. In a portable lamp device comprising a tubular casing having at least one open end, a frame adapted to be secured to said casing through said end, latch members on said frame, a disc secured to said frame, a plate, a light bulb unit secured to said plate, said plate adapted to engage the latch members of said frame when the plate is inserted in said frame, to have latching engagement with said latch members.

6. In a portable lamp, a tubular casing having at least one open end, a frame to be secured in said casing through said end, said frame having spaced arm members, latch members on said arm members, and a light bulb unit plate engaging the latch members of said arm members when the plate is inserted in said frame to interlock therewith, and to thus removably latch the light bulb unit plate to said frame.

7. A portable lamp device comprising a tubular casing having open ends, a frame adapted to be positioned in said casing, a disc secured to one end of said frame, for closing one end of the casing, means to secure a light bulb to said disc, a reflector rim for engaging and closing the other end of the casing, said rim and frame having complementary means for drawing the frame and rim together, to move the rim and disc into closing engagement with the ends of the tubular casing.

8. A portable lamp device comprising a tubular casing having open ends, a frame to be positioned within said casing, a disc secured to one end of said frame, for engaging and closing one end of the casing, means to secure a light bulb to said disc, a member for engaging and closing the other end of the casing, said member and frame having complementary means for drawing them together, to move the member and disc into closing engagement with the ends of the tubular casing.

PERCIVAL A. PIERREZ.

REFERENCES CITED

The following references are of record in the file of this patent:

UNITED STATES PATENTS

| Number | Name | Date |
| --- | --- | --- |
| 1,713,052 | Page | May 14, 1929 |
| 2,090,293 | Haines | Aug. 17, 1932 |
| 2,165,562 | Mack et al. | July 11, 1939 |